US012771653B2

(12) United States Patent
Kochhar et al.

(10) Patent No.: US 12,771,653 B2
(45) Date of Patent: *Oct. 20, 2026

(54) SYSTEMS AND METHODS FOR MITIGATING LATENCY ISSUES BETWEEN CLOUD COMPUTING COMPONENTS FEATURING RELATIONAL DATABASES WITHOUT REQUIRING SESSION PERSISTENCE USING STATE-SPECIFIC COMMUNICATION REFERENCE DIRECTORIES

(71) Applicant: Citibank, N.A., New York, NY (US)

(72) Inventors: Adarsh Kochhar, Mississauga (CA); Autumn Thomas, Jersey City, NJ (US); Kevin O'Sullivan, New York, NY (US); Peter Aherne, New York, NY (US); Rajat Kedia, London (GB); Tim Michael, London (GB); Vidhi Khatri, Mississauga (CA); Vidhir Kaup, Mississauga (CA); Vinod Rajaram, Jersey City, NJ (US)

(73) Assignee: Citibank, N.A., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/959,426

(22) Filed: Nov. 25, 2024

(65) Prior Publication Data

US 2025/0358238 A1 Nov. 20, 2025

Related U.S. Application Data

(63) Continuation of application No. 18/665,491, filed on May 15, 2024, now Pat. No. 12,166,689.

(51) Int. Cl.
*G06F 15/16* (2006.01)
*H04L 43/0852* (2022.01)
*H04L 47/76* (2022.01)

(52) U.S. Cl.
CPC .......... *H04L 47/76* (2013.01); *H04L 43/0852* (2013.01)

(58) Field of Classification Search
CPC ............................ H04L 43/0852; H04L 47/76
USPC .................................. 709/200–203, 217–223
See application file for complete search history.

(56) References Cited

U.S. PATENT DOCUMENTS

| | | | | |
|---|---|---|---|---|
| 7,650,341 | B1 * | 1/2010 | Oratovsky | G06F 11/1469 707/999.01 |
| 8,913,831 | B2 * | 12/2014 | Bergman | G06T 7/11 382/173 |
| 9,819,947 | B2 * | 11/2017 | Ye | H04N 19/117 |
| 10,797,994 | B1 * | 10/2020 | Munson | H04L 65/60 |
| 10,936,643 | B1 * | 3/2021 | Alspaugh | G06F 16/358 |
| 11,321,190 | B2 * | 5/2022 | Kumar | G06F 11/2048 |

(Continued)

*Primary Examiner* — Moustafa M Meky
(74) *Attorney, Agent, or Firm* — Foley & Lardner LLP

(57) ABSTRACT

Systems and methods for mitigating latency. For example, prior to ingesting a data stream, the system extracts a communication identifier from the data stream. The system may then compare the communication identifier to a state-specific communication reference directory that indicates a current state a given communication, a cloud component currently processing the communication (or a portion thereof), and/or other information used to sort the communication. As the state-specific communication reference directory ensures proper triaging of the data stream, the system is not reliant on maintaining session persistence.

20 Claims, 8 Drawing Sheets

(56) References Cited

U.S. PATENT DOCUMENTS

| | | | | |
|---|---|---|---|---|
| 11,343,314 | B1 * | 5/2022 | Muniswamy-Reddy .................... | G06F 11/2082 |
| 11,416,553 | B2 * | 8/2022 | Edelman ............... | G06F 16/278 |
| 11,451,866 | B2 * | 9/2022 | Bastable ............... | H04L 9/3247 |
| 12,166,689 | B1 * | 12/2024 | Kochhar ............. | H04L 43/0852 |
| 12,182,092 | B2 * | 12/2024 | Kumar .................. | G06F 16/245 |
| 12,316,718 | B2 * | 5/2025 | Ankireddypalle .... | H04L 67/565 |
| 12,470,489 | B2 * | 11/2025 | Peri ....................... | H04L 47/125 |
| 2012/0033875 | A1 * | 2/2012 | Bergman .................. | G06T 7/11 382/164 |
| 2013/0294747 | A1 * | 11/2013 | Takahashi .......... | H04N 21/8456 386/241 |
| 2019/0311148 | A1 * | 10/2019 | Andrade ............. | H04L 63/0861 |
| 2025/0324117 | A1 * | 10/2025 | Concolato .......... | H04N 21/4884 |

* cited by examiner

FIG. 2A
Status Report
Transaction Progress
1) S2 Awaiting approval
2) S1 Approval Granted
3) T4 delay

200

SYSTEMS AND METHODS FOR MITIGATING LATENCY ISSUES BETWEEN CLOUD COMPUTING COMPONENTS FEATURING RELATIONAL DATABASES WITHOUT REQUIRING SESSION PERSISTENCE USING STATE-SPECIFIC COMMUNICATION REFERENCE DIRECTORIES

CROSS-REFERENCE TO RELATED APPLICATION(S)

This application is a continuation of U.S. patent application Ser. No. 18/665,491, filed May 15, 2024. The content of the foregoing application is incorporated herein in its entirety by reference.

BACKGROUND

Cloud computing is a technology that allows individuals and organizations to access and use computing resources (like servers, storage, databases, networking, software, analytics) over the Internet, often referred to as "the cloud." This technology enables users to run applications and store data without having to manage physical servers or run software applications on their own computers by exchanging streams of data. Data streaming in cloud computing is a technology that enables the continuous flow of data from producers (sources) to consumers (destinations) over the internet. This process is crucial for applications that require real-time or near-real-time data processing, such as live analytics, monitoring systems, Internet of Things (IoT) applications, and more.

However, as the number of components in a cloud system increases, the number of data streams that require simultaneous processing also increases. As such, the available bandwidth through which a component may receive (or transmit) data is restricted, which can lead to latency and unreliability in the data stream and/or application using the data stream.

SUMMARY

Systems and methods are described herein for novel functionality and/or improvements to cloud computing systems. In particular, systems and methods are described herein for novel functionality and/or improvements to the transmission and/or reception of data streams between cloud computing components.

For example, balancing data streams from multiple components is crucial for ensuring efficient processing, scalability, and/or reliability in cloud computing systems. In existing systems, this is typically achieved through load balancing. Load balancing involves distributing incoming data streams across multiple servers or instances to ensure that no single server becomes a bottleneck. However, load balancing, while essential for distributing traffic across multiple servers to ensure reliability and high availability, requires session persistence. Session persistence involves ensuring that requests distributed across multiple servers to balance the load are consistently routed to the same server that originally handled the session. This is because the server receiving the subsequent requests may not have access to the session information created by another server, leading to issues like repeated login prompts, misidentified transactions, or disrupted workflows.

This technical issue is particularly problematic in cloud computing components that rely on a relational database. A relational database is a type of database that stores and provides access to data points that are related to one another. One manner of mitigating issues related to session persistence with relational databases is to perform a series of join operations (e.g., to combine the data from separate tables and/or databases) between the two cloud computing components participating in the communications. However, as the amount of data subject to the join operation increases this may further exacerbate bandwidth bottlenecks that the load balancing aimed to mitigate.

To overcome the technical issues related to ensuring efficient processing, scalability, and/or reliability in cloud computing systems processing data streams from multiple components, the systems and methods use a state-specific communication reference directory to triage incoming data streams. For example, prior to ingesting a data stream, the system extracts a communication identifier from the data stream. The system may then compare the communication identifier to a state-specific communication reference directory that indicates a current state a given communication, a cloud component currently processing the communication (or a portion thereof), and/or other information used to sort the communication. As the state-specific communication reference directory ensures proper triaging of the data stream, the system is not reliant on maintaining session persistence. Notably, the state-specific communication reference directory also alleviates the need for excess join operations in instances where relational databases are used.

For example, as opposed to simply directing a portion of the data stream to an available cloud computing component, the state-specific communication reference directory indicates the state of a communication corresponding to the portion. This state may describe not only a given cloud computing component (e.g., server) currently processing a communication (e.g., in order to prevent reloading of previous session information), but may also indicate the progress in that processing (e.g., if a function of a previous component has been completed and thus a new component may be used) as well as workflow or processing hierarchy characteristic of the communication. As a given cloud component processes (or completes) the processing of a portion of the communication, the state-specific communication reference directory is updated.

As an additional functional benefit, the presence of a communication identifier in the data stream and its comparison to the state-specific communication reference directory allows for the use of a splitter algorithm that may consume the data stream in series, but parallelly distribute it to a cloud component (e.g., as determined by the directory) based on the communication to which it corresponds. Notably, the existing data partitioning systems are limited to partitioning data based on source location or batch size, which may lead to difficulty in balancing the partitions and also requires the session persistence discussed above.

In some aspects, systems and methods for mitigating latency issues between cloud computing components using state-specific communication reference directories are described. For example, the system may receive a plurality of data streams. The system may detect a plurality of respective data stream identifiers in the plurality of data streams. The system may extract portions of the plurality of data streams based on the plurality of respective data stream identifiers. The system may retrieve a state-specific communication reference directory. The system may determine a first data stream identifier corresponding to a first portion of the portions of the plurality of data streams extracted based on the plurality of respective data stream identifiers. The system may compare the first data stream identifier to the state-specific communication reference directory to determine a first state of a first communication being processed. In response to determining the first state of the first communication being processed, the system may select a first cloud computing component of a plurality of cloud computing components to which to distribute the first portion.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
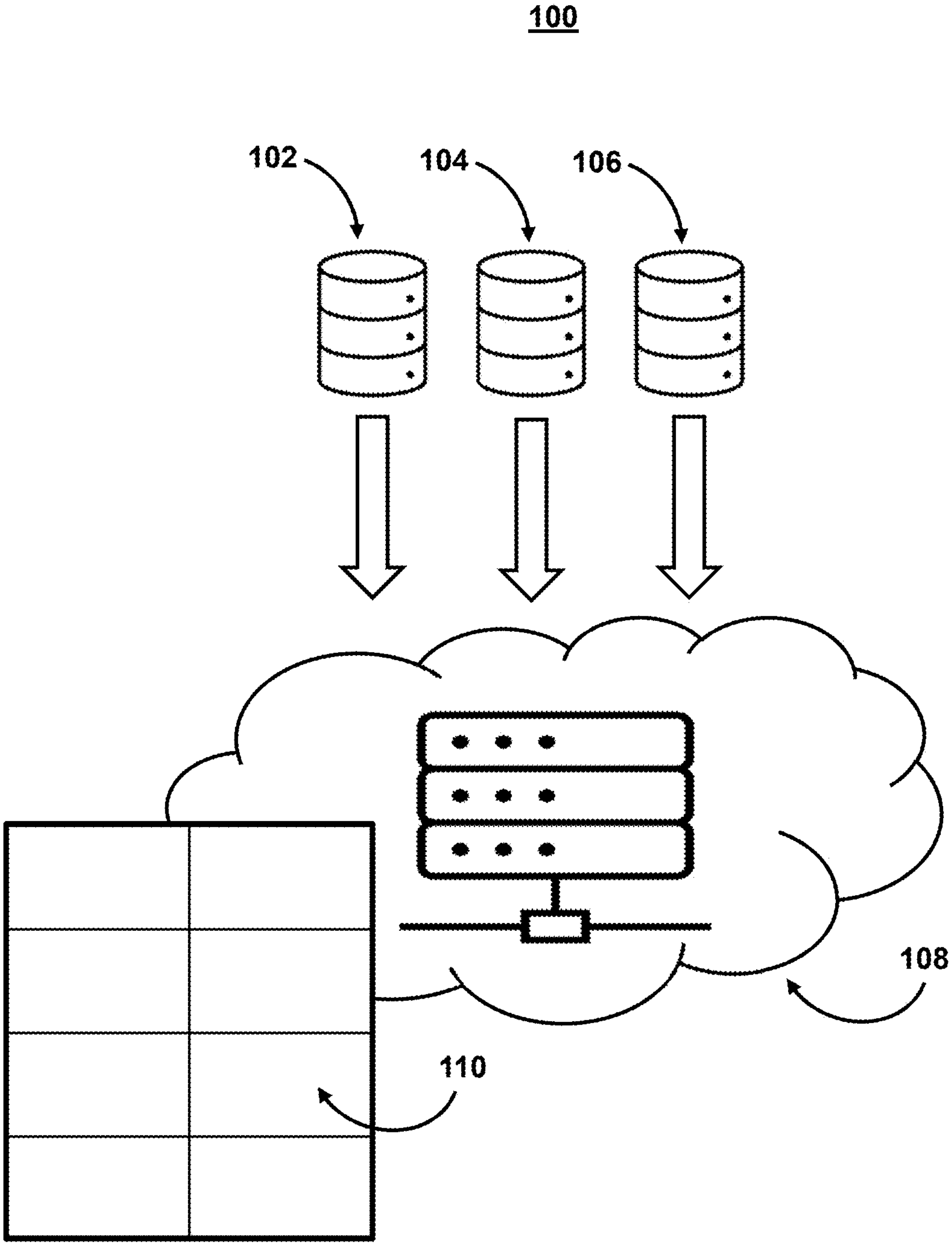
FIG. 1A shows an illustrative diagram for a state-specific communication reference directory, in accordance with one or more embodiments.

FIG. 1A shows an illustrative diagram for a state-specific communication reference directory, in accordance with one or more embodiments. For example, FIG. 1A shows system 100, which includes a plurality of data streams (e.g., data stream 102, data stream 104, and data stream 106) and a state-specific communication reference directory (e.g., directory 108).

For example, system 100 may receive a plurality of data streams (e.g., data stream 102, data stream 104, and data stream 106). A data stream may refer to a continuous, real-time flow of data generated by different data sources. These sources can include sensors, user interactions on websites, log files from servers, financial transactions, social media feeds, and many other types of data-producing activities. Data streams are characterized by their high velocity and volume, necessitating specialized processing techniques and technologies for real-time or near-real-time analytics.

System 100 (or directory 108) may detect a plurality of respective data stream identifiers in the plurality of data streams. Identifiers within a data stream may be unique markers or attributes used to distinguish or track individual elements or portions within the stream. These identifiers may be crucial for various aspects of data stream processing, including data management, event tracking, correlation, and analysis. The nature and structure of identifiers can vary widely depending on the source of the data stream and the specific application requirements. In some embodiments, timestamps may be identifiers that record the exact time when an event occurred or when data was generated. In data streams, timestamps are essential for ordering events, processing time-based windows, and ensuring that data is analyzed in the correct sequence.

In some embodiments, sequence numbers may be incremental identifiers assigned to each event or data item in the order they are generated or processed. They help in ensuring the data integrity and in reassembling data sequences in their original order after parallel processing. In some embodiments, event IDs may be identifiers that uniquely distinguish each event or data item in a stream. These IDs are crucial for tracking specific events, deduplicating data, and linking related events across different data streams or systems. In some data streams, especially those involving transactions or records, keys or key-value pairs act as identifiers. A key might represent a unique attribute of the data (like a user ID or device ID), enabling aggregation, filtering, and analysis based on specific entities. In some embodiments, correlation IDs are used to track and correlate multiple related events across different parts of a system or different stages in a processing pipeline. They are particularly useful in distributed systems and microservices architectures for tracing and debugging workflows. In some embodiments, composite identifiers combine two or more attributes to create a unique identifier for each event or data item. This approach is useful when no single attribute is unique on its own but the combination of attributes is.

System 100 (or directory 108) may extract portions of the plurality of data streams based on the plurality of respective data stream identifiers. A portion of a data stream may be understood as a subset or segment of the continuous flow of data that is distinguished or processed during a specific time frame or according to particular criteria. Since data streams involve the continuous, real-time flow of data, a portion may refer to various concepts depending on the context or the processing technique applied. In some cases, data within a stream is partitioned or grouped based on specific keys or identifiers (such as user ID, device ID, etc.). A portion of the data stream might refer to all the data belonging to a particular key. A portion could also be defined as a batch of events collected based on certain criteria, not necessarily time-bound. For example, all events related to a specific action or occurring until a particular condition is met. In some processing or storage mechanisms, data might be divided into chunks or blocks, which are then processed or stored separately. The size of these chunks could be based on data volume or other logical divisions within the stream. A portion may be a subset of data from the stream selected according to specific sampling criteria, which can be random or systematic. It serves as a representative portion of the larger data stream for analysis or monitoring purposes.

System 100 (or directory 108) may retrieve a state-specific communication reference directory. A state-specific communication reference directory may be a curated list or database that provides comprehensive information and communication references for cloud computing components, communications, and/or system functions having a specific state.

In some embodiments, directory 108 may include a plurality of fields (e.g., field 110) corresponding to one or more communications. In some embodiments, directory 108 may use a relational database in order to avoid excess join operations. For example, a relational database is a type of database that stores and provides access to data points that are related to one another. One manner of mitigating issues related to session persistence with relational databases is to perform a series of join operations (e.g., to combine the data from separate tables and/or databases) between the two cloud computing components participating in the communications. However, as the amount of data subject to the join operation increases this may further exacerbate bandwidth bottlenecks that the load balancing aimed to mitigate.

The relational database may be structured using tables to manage data efficiently. In the context of tracking different states of a communication from various data streams, the database would typically employ several interrelated tables to handle this complexity. For example, each communication may be represented as a record in a "Communications" table. This table might include fields such as "CommunicationID," "DataStreamID," "Timestamp," and/or "Content." The "DataStreamID" may link each communication to its respective data stream, which could be identified in another table called "DataStreams." This table may store details about each data stream, such as "DataStreamID," "Source," "Type," and "Description."

To track the different states of each communication (e.g., sent, received, processed, status, etc.), a "States" table may be used. This table could include fields such as "StateID," "StateName," and/or "StateDescription." In such cases, another table (e.g., "CommunicationStates") may be used to serve as a linking table between "Communications" and "States." It may include fields like "CommunicationID," "StateID," and "Timestamp," indicating when each communication reached a particular state. This structure allows for efficient querying and updating of the communication states across multiple data streams. For instance, one could quickly find all communications from a particular stream that are in a specific state and/or update the state of a communication as it progresses through a workflow.

Figure 1B:
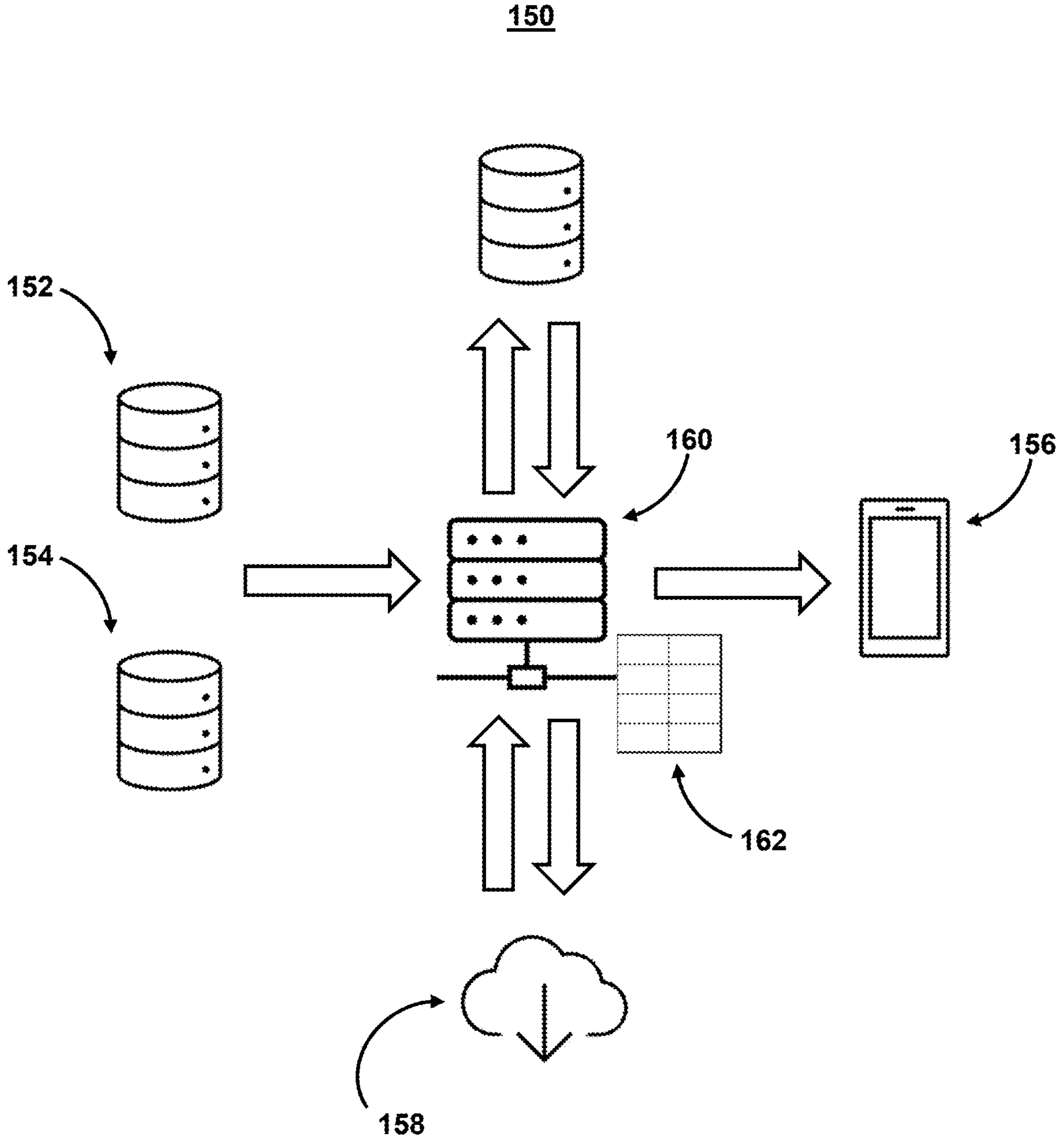
FIG. 1B shows an illustrative system for mitigating latency issues, in accordance with one or more embodiments.

FIG. 1B shows an illustrative system for mitigating latency issues, in accordance with one or more embodiments. For example, system 150 may represent a state-specific communication reference directory implemented within a cloud computing system and/or network. For example, data stream 152 and/or data stream 154 may transmit communications to server 160, which may comprise a state-specific communication reference directory (e.g., directory 162). Server 160 may then route communications to device 156 and/or device 158.

For example, system 150 (or server 160 or directory 162) may determine a first data stream identifier corresponding to a first portion of the portions of the plurality of data streams extracted based on the plurality of respective data stream identifiers. System 100 (or server 160 or directory 162) may compare the first data stream identifier to the state-specific communication reference directory to determine a first state of a first communication being processed, wherein the first state is based on a processing hierarchy characteristic of the first communication.

The system may determine a state of a communication. The state of the communication may correspond to a state characteristic of the communication, which may correspond to a workflow, cloud computing device, a processing function, etc. For example, state characteristics of a workflow may describe the attributes or properties that define the current condition, behavior, and progress of a workflow process. A workflow, in this context, refers to a sequence of tasks or activities designed to achieve a specific outcome or goal, often within a business or technical process. Understanding these characteristics is crucial for managing, optimizing, and troubleshooting workflows.

For example, the state characteristic may comprise a status of the communication, device used to process the communication, function being performed on the communication, etc. (e.g., the current phase or stage of the workflow). Common statuses include initiated, in progress, paused, completed, and failed. The status provides a high-level overview of where the workflow is in its lifecycle.

For example, the state characteristic may comprise a progress of the communication, device used to process the communication, function being performed on the communication, etc. (e.g., a measure of how far along the workflow is towards completion). Progress can be quantified in terms of the number of tasks completed, the percentage of the process finished, or through milestones reached.

For example, the state characteristic may comprise a data state of the communication, device used to process the communication, function being performed on the communication, etc. (e.g., the current condition of data being processed within the workflow). This includes the availability, integrity, and correctness of data inputs and outputs at various stages of the workflow.

For example, the state characteristic may comprise a resource utilization related to the communication, device used to process the communication, function being performed on the communication, etc. (e.g., the consumption of resources (such as CPU, memory, network bandwidth, or human resources) by the communication).

For example, the state characteristic may comprise performance metrics related to the communication, device used to process the communication, function being performed on the communication, etc. (e.g., quantitative measures of the communication's workflow's efficiency, such as throughput (tasks completed per unit of time), latency (time taken to complete a task or set of tasks), and error rates).

For example, the state characteristic may comprise concurrent activities related to the communication, device used to process the communication, function being performed on the communication, etc. (e.g., the number and nature of tasks that are being executed in parallel within the communication). For example, high levels of concurrency can improve efficiency but may also increase complexity and the potential for conflicts or bottlenecks.

For example, the state characteristic may comprise dependencies related to the communication, device used to process the communication, function being performed on the communication, etc. (e.g., relationships between tasks that dictate the order of execution). Dependencies can be sequential (one task must finish before another begins) or conditional (a task's execution depends on specific criteria being met).

For example, the state characteristic may comprise security and/or compliance information related to the communication, device used to process the communication, function being performed on the communication, etc. (e.g., the adherence of the workflow to security protocols and compliance requirements). This includes data protection measures, access controls, and audit trails to ensure the workflow meets regulatory standards.

A processing hierarchy characteristic for processing a portion of a data stream may refer to the structured layering or ordering of processing stages or components through which the data passes. In the context of data stream processing, this hierarchical structure may be designed to organize the sequence and manner in which data is processed in a communication, often optimizing for efficiency, scalability, and the ability to handle complex processing logic. For example, a communication may be processed according to a series of steps or layers.

An ingestion layer may be the first level where raw data streams are collected from various sources. This layer is responsible for initial data capture and possibly some lightweight preprocessing to normalize formats or filter noise. A storage/buffering layer may temporarily store data to decouple the ingestion process from further processing stages. This layer can help manage load spikes and ensure data integrity. The processing layer may be the core of the hierarchy where the main logic for data transformation, aggregation, analysis, or enrichment is applied. This layer may itself be composed of multiple sub-layers or components, each dedicated to specific types of processing tasks. The output layer may handle the delivery of processed data to downstream systems, databases, applications, or services. This can include exporting data for storage, visualizing results, or triggering actions based on data insights.

The hierarchy allows for both sequential processing, where data moves through stages in a defined order, and parallel processing, where data is processed concurrently across multiple nodes or components within the same layer to enhance performance and scalability. Hierarchical processing supports scalability, allowing for the dynamic addition of processing resources at different levels to handle increasing data volumes or complexity. It also provides flexibility to evolve the processing logic by adding, removing, or modifying layers and components within the hierarchy without disrupting the overall workflow. The processing hierarchy can facilitate state management, especially in stateful processing scenarios where knowledge of previous data is essential for current data processing. State can be maintained within specific layers, with mechanisms for checkpointing and state recovery.

In response to determining the first state of the first communication being processed, system 150 (or server 160 or directory 162) may select a first relational database in a first cloud computing component of a plurality of cloud computing components to which to distribute the first portion.

For example, selecting a cloud computing component from a plurality of components to process a portion of a communication based on the state of the communication involves dynamic decision-making mechanisms. These mechanisms consider the current state of the communication, the capabilities and availability of the components, and possibly the requirements of the task at hand. This process ensures that communications are handled efficiently, leveraging the strengths of different components in a cloud computing environment.

The system may first analyze the state of the communication being processed. This can include various factors such as: Content Type (e.g., differentiating between text, image, video, etc.), urgency (e.g., prioritizing communications based on their time sensitivity), security requirements (e.g., identifying any encryption or compliance needs), volume (assessing the size of the data or communication to be processed), and/or processing history (e.g., considering how similar communications have been handled in the past).

For example, each cloud computing component may have specific capabilities, performance characteristics, and costs associated with its use. The system evaluates these aspects, which can include: resource availability (e.g., checking the current load and availability of resources in each component), performance metrics (e.g., evaluating the historical performance of components for similar tasks), cost efficiency (e.g., considering the cost implications of using each component) and/or compliance and security (e.g., ensuring that the component meets any necessary compliance and security standards required for the communication).

The system may use one or more decision-making algorithms to select the most suitable component. For example, the system may use rule-based systems (e.g., using predefined rules that map specific states or types of communication to certain components), artificial intelligence models (e.g., leveraging predictive models that analyze historical data to make decisions about which component is likely to offer the best performance for the current state of the communication), and/or load balancing algorithms (e.g., distributing the load evenly across available components while considering the specific requirements of the communication). For example, the system may use a splitter algorithm that that may consume the data stream in series, but parallelly distribute it to a cloud component (e.g., as determined by the directory) based on the communication to which it corresponds.

System 150 (or server 160 or directory 162) may distribute the first portion to the first cloud computing component using a splitter algorithm. A splitter algorithm may be used to partition data streams by dividing a continuous stream of data into smaller, more manageable subsets or partitions. This division can be based on various criteria depending on the requirements of the system or application processing the data stream. The goal of a splitter algorithm is to enable parallel processing, improve scalability, and facilitate more efficient data management within distributed systems, real-time analytics platforms, or stream processing frameworks. The criteria may include key or value attributes within the data itself (e.g., user ID, geographic location), hash functions applied to certain data elements to distribute data evenly, or round-robin distribution for uniform load distribution without regard to data content.

System 150 (or server 160 or directory 162) may process the first communication at the first cloud computing component using the first portion. System 150 (or server 160 or directory 162) may determine a second state of the first communication based on processing the first communication at the first cloud computing component using the first portion. System 150 (or server 160 or directory 162) may update the state-specific communication reference directory with the second state for the first communication.

Figure 1C:
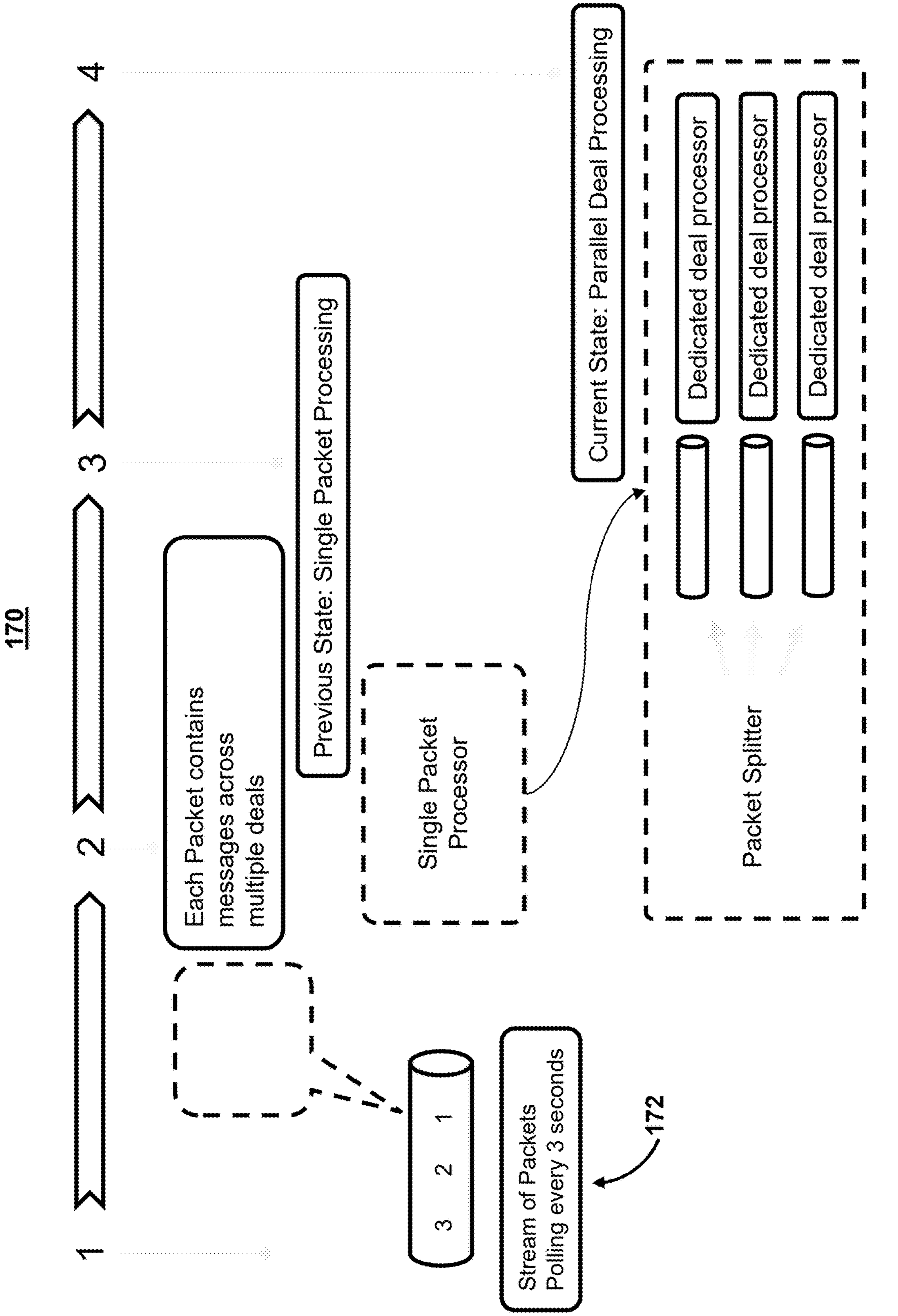
FIG. 1C shows an illustrative diagram for a splitter operation, in accordance with one or more embodiments.

FIG. 1C shows an illustrative diagram for a splitter operation, in accordance with one or more embodiments. For example, as described above, the presence of a communication identifier in the data stream and its comparison to the state-specific communication reference directory allows for the use of a splitter algorithm that may consume the data stream in series, but parallelly distribute it to a cloud component (e.g., as determined by the directory) based on the communication to which it corresponds. Notably, the existing data partitioning systems are limited to partitioning data based on source location or batch size, which may lead to difficulty in balancing the partitions and also requires the session persistence discussed above. Using the aforementioned splitter operation, the system may mitigate latency issues between cloud computing components.

As shown in FIG. 1C, diagram 170 may represent an embodiment of a splitter algorithm to consume data streams in parallel, yet the algorithm maintains required message sequence. For example, diagram 170 may represent when data streams are providing information for various deals (e.g., multi-party transactions) and/or workflows. As a further example, diagram 170 may illustrate steps one through four of using a splitter algorithm to process incoming data streams.

For example, diagram 170 may show how the system handles a continuous event stream sourced from an external API, which is polled (e.g., at via polling 172) at a given interval (e.g., every three seconds). For each poll, a third party API may return a packet (e.g., of up to 200 events), which be from different ongoing deals and/or workflows. Each packet may need meticulous processing to extract individual events (e.g., portions of the plurality of data streams) and to identify the unique deal ID (e.g., a data stream identifier) associated with each event. The system may use the unique deal ID (e.g., a data stream identifier) as the primary criteria for maintaining partition affinity within a streaming messaging ecosystem.

For example, when a first event for a given communication (e.g., deal) arrives at the system boundary, the system may perform steps one through four to ingest the event.

At step one, the system looks up, in a registry database table (e.g., a state-specific communication reference directory), the partition-id of the last entry. For example, a system query may return a last deal-id=20240319 and a partition-id=25. For example, a system that utilizes a registry database table to manage and look up state-specific communication references, such as a directory tracking various deal states, the process of finding the partition-id of the last entry for a specified deal involves a series of structured database operations. The registry database table may be structured to hold entries each containing information such as deal-id, partition-id, and possibly timestamps or other relevant metadata. This table allows the system to track the progress or status of deals across different partitions, which could correspond to different stages or aspects of the deals. When the system needs to look up the partition-id of the last entry for a specific deal, it would execute a query against this registry table. The query would specifically request the entry with the maximum timestamp (or the highest deal-id if entries are chronologically sequential without timestamps) for the specified deal-id. This ensures that the query returns the most recent state of the deal. This query sorts all records for the given deal-id in descending order based on their timestamp, ensuring the most recent entry is selected first. By executing such a query, the system efficiently retrieves the partition-id of the last recorded entry for the deal, enabling it to access or update the corresponding data stored in that partition. This approach is particularly useful in distributed systems where data about a single entity might be spread across different nodes or partitions to optimize performance and scalability.

At step two, the system makes a new registry entry in a database table with deal-id as primary identifier and the next sequential partition-id. (e.g., deal-id=20240320, partition-id=26). In a system that manages registry entries in a database table where the deal-id serves as the primary identifier and entries are associated with sequential partition-ids, making a new registry entry involves a few key database operations to ensure data integrity and sequential logic. To create a new entry, the system first needs to determine the next sequential partition-id for the given deal-id. This involves querying the database to find the highest current partition-id associated with that deal-id. This query returns the maximum (or last) partition-id used for that deal-id. Once the system retrieves the last partition-id, the next step is to increment this value by one to maintain sequence. This incremented value becomes the partition-id for the new entry. The system then proceeds to insert a new record into the registry table. The insertion might involve specifying not only the deal-id and the new partition-id but also other pertinent data such as the state of the deal, timestamps, and any relevant metadata. This method of handling registry entries ensures that each new record for a given deal-id is accurately sequenced by partition-id, maintaining orderly data management and allowing for efficient retrieval and analysis of the deal's lifecycle across its various stages.

At step three, the system prepares an envelope with the partition-id and event and publishes this to a stream-processing software platform. In a system where data, such as events related to specific deals, needs to be published to a stream-processing software platform, the process of preparing and publishing may involve several detailed steps to ensure accurate and reliable message delivery. First, the system prepares an envelope, which is a structured data packet that includes key information such as the partition-id and the event details. The partition-id is crucial for directing the message to the correct partition of a topic in the stream-processing software platform, which aids in maintaining order within the data and optimizing processing. The event typically contains the data payload that describes the action or change in state pertaining to a deal or similar business entity.

To construct this envelope, the system may serialize the event into a JSON format (or another suitable serialization format), including necessary identifiers, timestamps, and the actual content of the event. This serialization step converts the event from an internal representation to a format that can be easily transmitted over the network and understood by the stream-processing platform.

At step four, the system may route this envelope to the stamped partition-id. (e.g., in this case to partition-id=26). For example, once the envelope is prepared, the system then connects to the stream-processing platform using a producer API. This API is designed to handle connections, manage sessions, and ensure data is published efficiently to the platform. The producer configures its settings, such as specifying the target topic and any required security credentials or protocol settings (like SSL/TLS for encryption or SASL/SCRAM for authentication). With the connection established and the envelope ready, the system uses the producer to send the message. If a stream-processing software platform is used, the partition-id within the envelope can explicitly direct the stream-processing software platform broker to place the message in a specific partition, which can be particularly useful for maintaining the order of messages within the same context (e.g., all events related to a particular deal). The stream-processing software platform's producer ensures that the message is written to the log of the appropriate partition and replicates it across the cluster for fault tolerance.

Finally, the stream-processing software platform may acknowledge the successful receipt of the message to the producer, completing the publishing process. The message is now available in the stream-processing software platform topic for real-time processing by consumers subscribed to that topic, enabling downstream applications to react to the event according to their specific roles within the larger system architecture. This process not only ensures data is reliably transmitted but also that it is ready for immediate and asynchronous processing, which is a cornerstone of effective stream-processing in distributed systems.

For any subsequent event of a deal that has an entry in the system registry, the partition id is pulled from the database. For example, if another event arrives for deal-id=20240320—the database query will return partition-id=26-which is where this event will be sent. This ensures all events for a deal always land in the same partition-which helps maintain the sequential processing requirement of the event stream associated with a deal.

In addition to ensuring that the system adheres to the strict sequencing requirement for the event stream associated with a deal, this implementation enables increased parallel processing for events across multiple deals. On any given day, the system has multiple ongoing deals running globally. Given that each packet can contain 200 events across multiple deals, this implementation allows splitting the events associated with the same deal-id across 29-partitions in a single streaming platform topic. The system maximizes throughput and scalability, effectively handling diverse workloads with optimal resource utilization.

Figure 2A:
FIG. 2A shows an illustrative diagram for a first user interface used to receive status updates based on a state-specific communication reference, in accordance with one or more embodiments.

FIG. 2A shows an illustrative diagram for a first user interface used to receive status updates based on a state-specific communication reference, in accordance with one or more embodiments. For example, FIG. 2A shows user interface 200. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, a "communication" should be understood to mean an electronically consumable content, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

In some embodiments, the system may generate information about the state of a communication. For example, the system may process a first communication and generate an output related to the first output.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

Figure 2B:
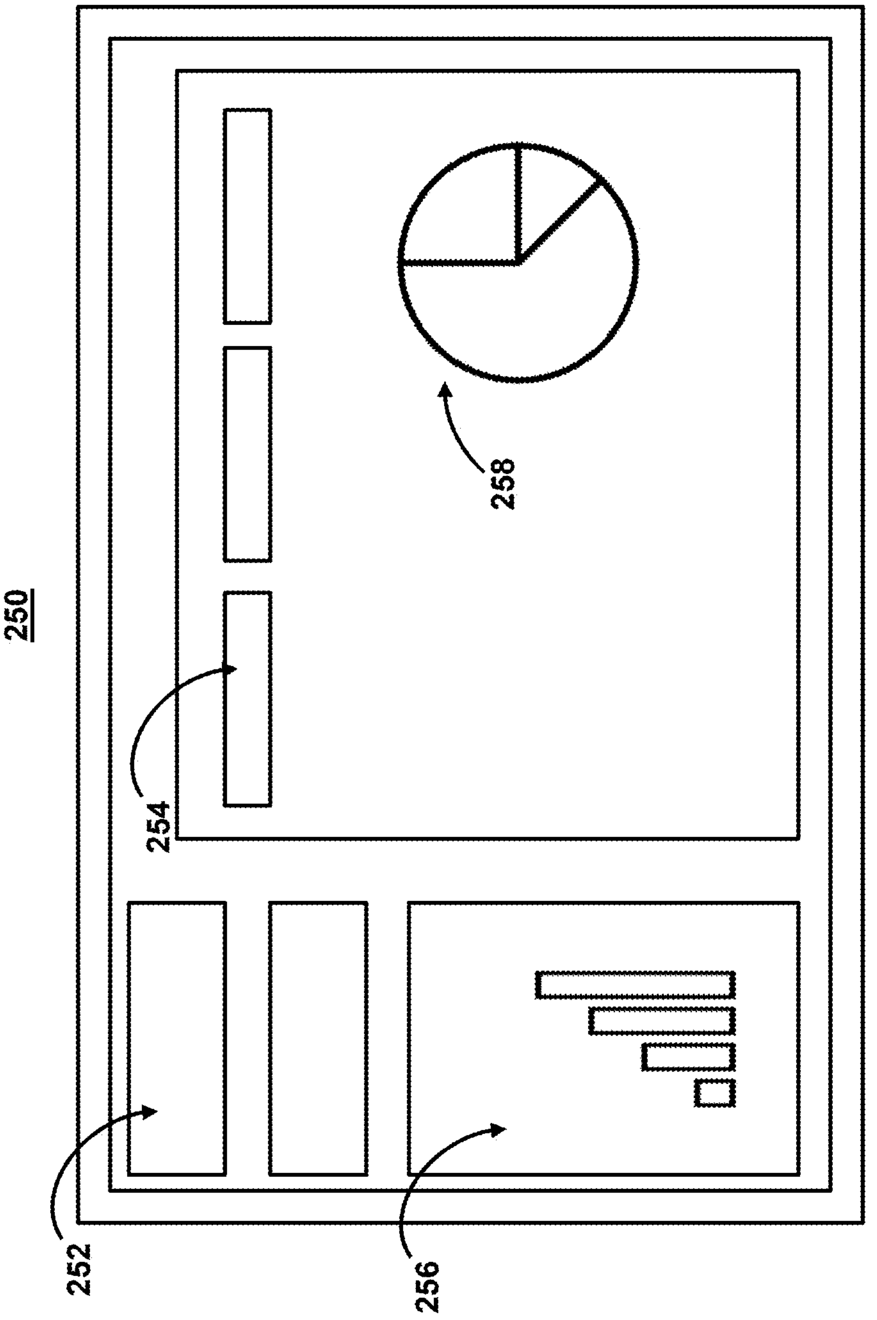
FIG. 2B shows an illustrative diagram for a second user interface used to select data streams, in accordance with one or more embodiments.

FIG. 2B shows an illustrative diagram for a second user interface used to select data streams, in accordance with one or more embodiments. For example, FIG. 2*b* shows user interface 250. For example, user interface 250 may comprise a mechanism for selecting data streams and/or facilitating one or more workflows of communications. For example, user interface 250 may include various sections (e.g., section 252, section 254, and section 256). Each section may include different information related to a communication, data stream, and/or data source. User interface 250 may also include one or more graphical displays (e.g., graph 258). User interface 250 may use its sections and graph to convey information to a user.

In some embodiments, the system may receive a manual user selection of a given communication (or content related to a communication) and/or data streams for use in processing one or more communications. For example, the system may receive a user input requesting the first communication and in response to the user input, select the first data stream identifier from a plurality of data stream identifiers in the plurality of data streams and/or the plurality of data streams.

In some embodiments, the system may receive a user input and select a resource cluster characteristic based on the user input. As described herein, a resource cluster characteristic may comprise any characteristic used to distinguish one cluster of resources and/or data streams from another. For example, a resource cluster characteristic may comprise selection criteria used to select a given data stream, group of data streams, and/or portions of a data stream. In some embodiments, the system may select, using an artificial intelligence model, the plurality of data streams for a resource cluster based on the resource cluster characteristic.

For example, in an embodiment where user interface 250 manages a portfolio of deals from multiple data streams, user interface 250 may be used to select one or more data streams. The selection process may involve filtering and prioritization based on predefined criteria to identify the most relevant and valuable deals. Each data stream corresponds to a different source of deals, such as various financial institutions, marketplaces, or corporate deal pipelines. These streams can be highly varied in terms of deal structure, industry focus, geographic location, and financial parameters. The system may begin by aggregating the incoming deals from these various streams into a centralized database. Each deal is tagged with metadata corresponding to its data stream, which includes details such as the source, type of deal, date of entry, financial metrics, and other relevant descriptors.

Selection may be governed by a set of algorithms or rules designed to align with the strategic goals of the portfolio (e.g., one or more resource cluster characteristics). These might include diversification targets (e.g., limiting exposure to any single industry or geographic area), financial thresholds (e.g., deals above a certain size), or expected return metrics. The system applies these filters to identify deals that match the portfolio's criteria. Further refinement may be done through scoring models that assess each deal on multiple dimensions, such as risk, potential return, and strategic fit with existing portfolio components. Deals that score above a certain threshold might be automatically included in the portfolio, while others could be reviewed manually by analysts.

Moreover, the system can dynamically adjust its selection criteria (e.g., one or more resource cluster characteristics) based on real-time feedback and changing market conditions. This allows the portfolio to remain agile, optimizing for both current performance and future growth opportunities. The final selection of deals thus represents a carefully curated set of investments designed to maximize the overall value and alignment with the portfolio's strategic objectives.

Figure 3A:
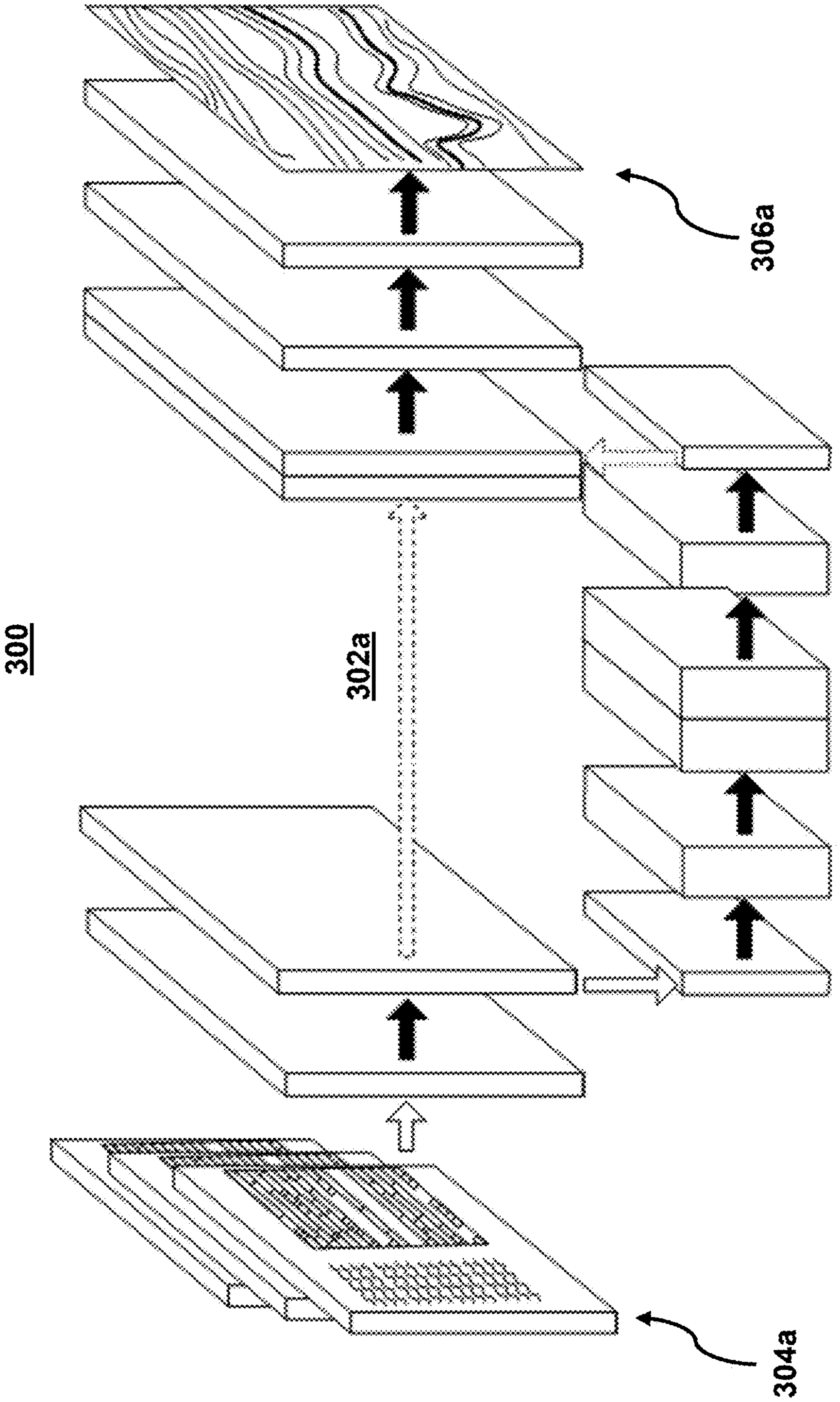
FIGS. 3A-B show illustrative components for a system used to mitigate latency issues between cloud computing components, in accordance with one or more embodiments.
Figure 3B:
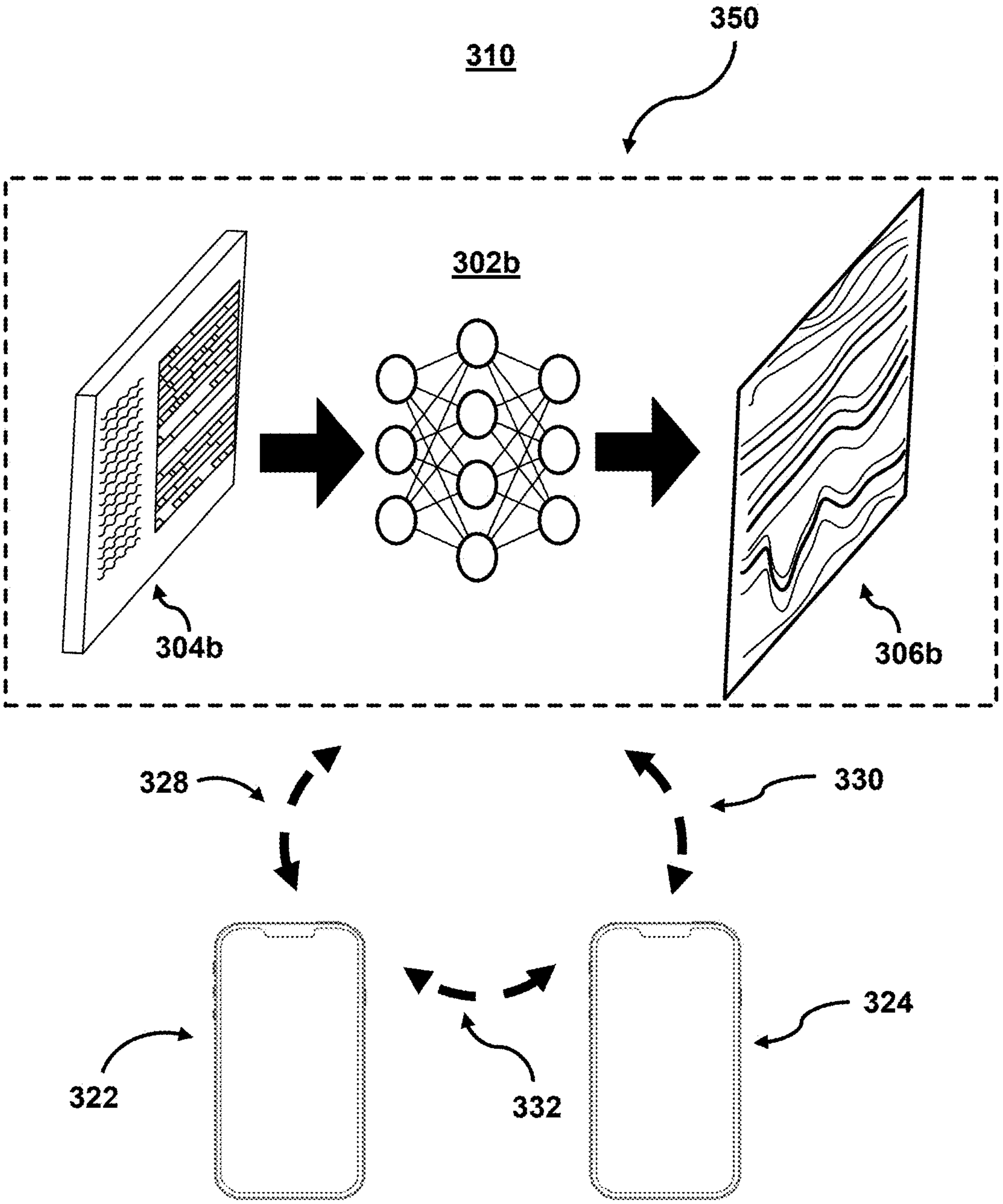

FIGS. 3A-B shows illustrative components for a system used to mitigate latency issues between cloud computing components, in accordance with one or more embodiments. For example, FIG. 3A may represent a model architecture used to mitigate latency issues between cloud computing components.

System 300 also includes model 302*a*, which may be a machine learning model, artificial intelligence model, etc. (which may be referred collectively as "models" herein). Model 302*a* may take inputs 304*a* and provide outputs 306*a*. The inputs may include multiple datasets, such as a training dataset and a test dataset. Each of the plurality of datasets (e.g., inputs 304*a*) may include data subsets related to user data, predicted forecasts and/or errors, and/or actual forecasts and/or errors. In some embodiments, outputs 306*a* may be fed back to model 302*a* as input to train model 302 (e.g., alone or in conjunction with user indications of the accuracy of outputs 30*a*6, labels associated with the inputs, or with other reference feedback information). For example, the system may receive a first labeled feature input, wherein the first labeled feature input is labeled with a known prediction for the first labeled feature input. The system may then train the first model to classify the first labeled feature input with the known prediction (e.g., a portion of a data stream, a data stream identifier, a state for the state-specific communication reference directory, a cloud computing component, a resource cluster, etc.).

In a variety of embodiments, model 302*a* may update its configurations (e.g., weights, biases, or other parameters) based on the assessment of its prediction (e.g., outputs 306*a*) and reference feedback information (e.g., user indication of accuracy, reference labels, or other information). In a variety of embodiments, where model 302*a* is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302*a* may be trained to generate better predictions.

In some embodiments, the model (e.g., model 302*a*) may automatically perform actions based on outputs 306. In some embodiments, the model (e.g., model 302*a*) may not perform any actions. The output of the model (e.g., model 302*a*) may be used to select a portion of a data stream, a data stream identifier, a state for the state-specific communication reference directory, a cloud computing component, etc.

FIG. 3B shows illustrative components for a system used to mitigate latency issues between cloud computing components, in accordance with one or more embodiments. For example, FIG. 3B may show illustrative components for mitigating latency issues. As shown in FIG. 3B, system 310 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system, and may feature one or more component devices. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on mobile device 322 or mobile device 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302*b* may be trained by taking inputs 304*b* and provide outputs 306*b*. Model 302*b* may include an artificial neural network. In such embodiments, model 302*b* may include an input layer and one or more hidden layers. Each neural unit of model 302*b* may be connected with many other neural units of model 302*b*. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302*b* may be self-learning and trained, rather than explicitly programmed, and can perform significantly better in certain areas of problem solving, as compared to traditional computer programs. During training, an output layer of model 302 may correspond to a classification of model 302*b*, and an input known to correspond to that classification may be input into an input layer of model 302*b* during training. During testing, an input without a known classification may be input into the input layer, and a determined classification may be output.

In some embodiments, model 302*b* may include multiple layers (e.g., where a signal path traverses from front layers to back layers). In some embodiments, back propagation techniques may be utilized by model 302*b* where forward stimulation is used to reset weights on the “front” neural units. In some embodiments, stimulation and inhibition for model 302 may be more free-flowing, with connections interacting in a more chaotic and complex fashion. During testing, an output layer of model 302*b* may indicate whether or not a given input corresponds to a classification of model 302*b* (e.g., a portion of a data stream, a data stream identifier, a state for the state-specific communication reference directory, a cloud computing component, etc.).

Model 302*b* is shown as a convolutional neural network. A convolutional neural network consists of an input layer (e.g., input 304*a*), hidden layers, and an output layer (e.g., output 306*b*). As shown in FIG. 3B, the middle layers are called hidden because their inputs and outputs are masked by the activation function and final convolution. In a convolutional neural network, the hidden layers include layers that perform convolutions. Model 302*b* may comprise convolutional layers that convolve the input and pass its result to the next layer. Model 302*b* includes local and/or global pooling layers along with traditional convolutional layers. Pooling layers reduce the dimensions of data by combining the outputs of neuron clusters at one layer into a single neuron in the next layer. Also as shown, model 302*b* may comprise fully connected layers that connect every neuron in one layer to every neuron in another layer.

Figure 4:
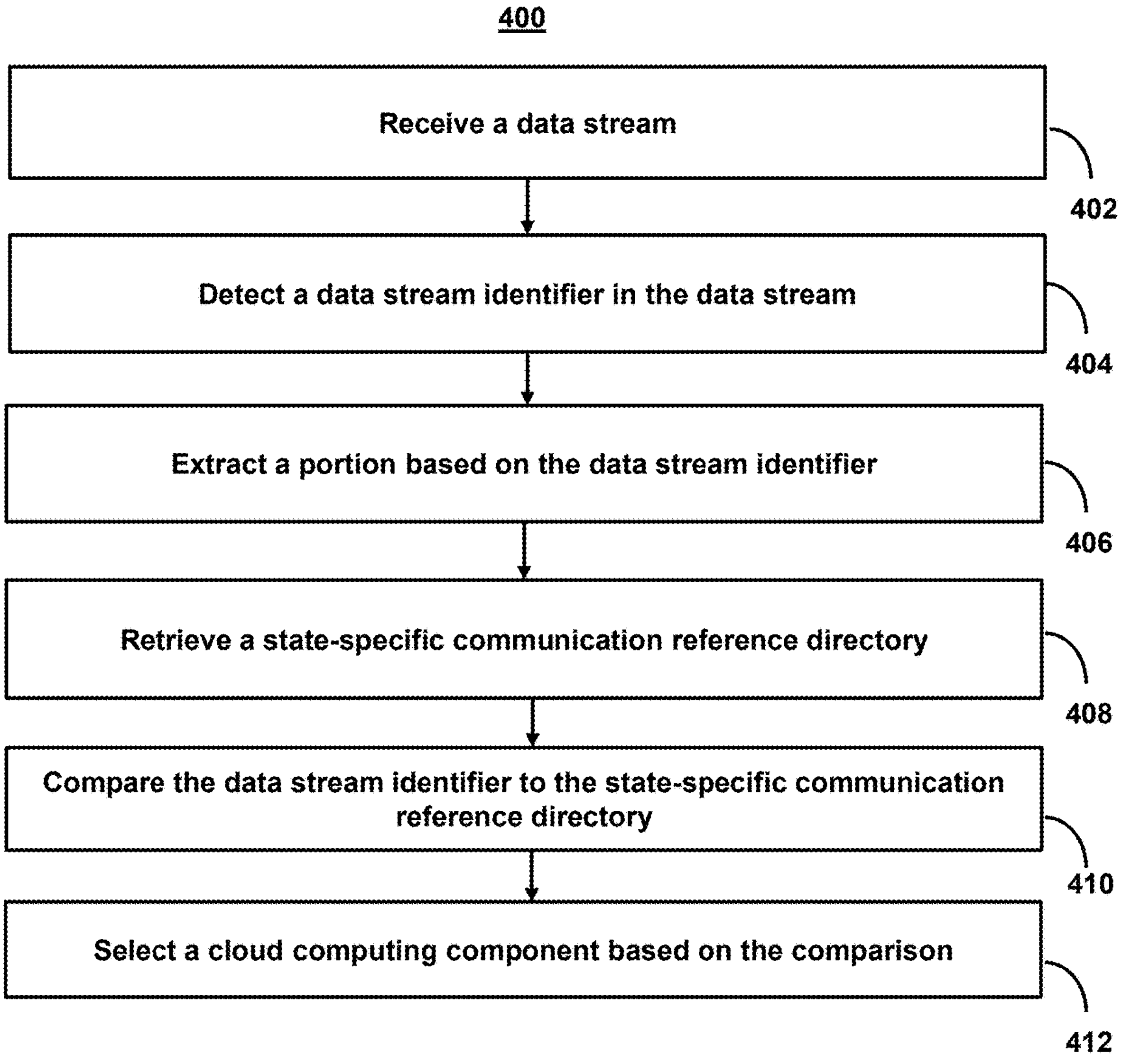
FIG. 4 shows a flowchart of the steps involved in mitigating latency issues between cloud computing components, in accordance with one or more embodiments.

FIG. 4 shows a flowchart of the steps involved in mitigating latency issues between cloud computing components, in accordance with one or more embodiments. For example, the system may use process 400 (e.g., as implemented on one or more system components described above) in order to mitigate latency issues between cloud computing components using state-specific communication reference directories.

At step 402, process 400 (e.g., using one or more components described above) receive a data stream. For example, the system may receive a plurality of data streams.

At step 404, process 400 (e.g., using one or more components described above) detect a data stream identifier in the data stream. For example, the system may detect a plurality of respective data stream identifiers in the plurality of data streams.

At step 406, process 400 (e.g., using one or more components described above) extract a portion based on the data stream identifier. For example, the system may extract portions of the plurality of data streams based on the plurality of respective data stream identifiers.

In some embodiments, the system may extract, using a splitter algorithm, the first portion from the plurality of data streams. The system may then distribute, using the splitter algorithm, the first portion to the first cloud computing component. For example, the system may first ingest data from a variety of sources. These data streams might include logs from web servers, transactions from databases, sensor data from IoT devices, or any other real-time data feeds.

The system may then determine a communication corresponding to a portion of the data stream (e.g., using the state-specific communication reference directory). For example, the system may normalize the data formats to ensure data quality and to perform initial filtering to discard irrelevant data. The system may then invoke the splitter algorithm to analyze the ingested data. The algorithm is designed to identify meaningful ways to segment the data into portions based on predefined criteria. This could be based on data attributes, such as user IDs or geographic locations, or based on more complex logic tailored to the specific application's needs as determine by the state-specific communication reference directory. Using the splitter algorithm, the system extracts a first portion of the data. This extraction is based on the criteria defined within the algorithm, ensuring that this portion is distinct and suitable for independent processing.

The system identifies which cloud computing components are suitable for processing the extracted portion of data. This decision can be based on several factors, including the processing requirements of the data portion, the current load and availability of computing resources, and any specific computational capabilities or services offered by the components. The splitter algorithm is also responsible for determining how the extracted data portion is distributed to the selected cloud computing component(s). The algorithm might route data based on load balancing principles, processing capabilities, or specific component affinities to optimize performance and resource utilization.

At step 408, process 400 (e.g., using one or more components described above) retrieve a state-specific communication reference directory. For example, the system may retrieve a state-specific communication reference directory. In some embodiments, the system may store a plurality of state-specific communication reference directories. The system may use information (e.g., metadata) in a data stream to select a given state-specific communication reference directory.

At step 410, process 400 (e.g., using one or more components described above) compare the data stream identifier to the state-specific communication reference directory. For example, the system may determine a first data stream identifier corresponding to a first portion of the portions of the plurality of data streams extracted based on the plurality of respective data stream identifiers. The system may then compare the first data stream identifier to the state-specific communication reference directory to determine a first state of a first communication being processed.

At step 412, process 400 (e.g., using one or more components described above) select a cloud computing component based on the comparison. For example, the system may, in response to determining the first state of the first communication being processed, select a first cloud computing component of a plurality of cloud computing components to which to distribute the first portion.

In some embodiments, the system determines a cloud computing component identifier based on the state-specific communication reference directory corresponding to the first communication and determines the first state of the first communication being processed based on the cloud computing component identifier. For example, the system receives the first communication, which is a piece of data, message, or request needing processing. It classifies the communication based on its content, source, urgency, security requirements, and other relevant attributes. This classification could involve parsing the communication, metadata analysis, or applying machine learning models for more complex classifications. Based on the initial classification, the system consults the state-specific communication reference directory. This directory maps types or categories of communications to specific processing requirements, including which cloud computing components are suited for processing them. The directory provides information on the appropriate cloud computing component (or components) for processing the communication, identified by unique identifiers (IDs). These identifiers specify particular services, functions, or resources in the cloud environment tailored to the communication's needs. With the cloud computing component identifier determined, the system routes the communication to the specified component for processing. This routing is typically managed by a cloud orchestration layer or service mesh that understands how to interpret component identifiers and direct traffic accordingly. The first state of the communication being processed is established based on its assignment to a specific cloud component. This state reflects not only the processing phase (e.g., "queued for processing", "under analysis") but also the communication's context within the broader cloud infrastructure (e.g., "awaiting decryption service", "pending data normalization"). The designated cloud computing component processes the communication according to its role—this could involve data analysis, transformation, storage, forwarding to another service, etc. As the communication progresses through different stages of processing, its state is updated to reflect current status, processing outcomes, or any errors encountered. This state management is crucial for monitoring, logging, and potentially triggering subsequent processing steps or workflows. The system can dynamically adjust processing paths or components based on real-time feedback, processing outcomes, or changes in cloud resource availability. For instance, if the initially selected component becomes overloaded, the system might reroute communications to an alternative component with similar capabilities. Performance data, processing outcomes, and utilization metrics can feed back into the state-specific communication reference directory, allowing for continuous optimization of processing mappings and component identifiers based on actual system performance.

In some embodiments, the system determines a first workflow status of the first communication in a routine of the first cloud computing component based on the state-specific communication reference directory corresponding to the first communication and determines the first state of the first communication being processed based on the first workflow status. Upon receiving the first communication, the system classifies it based on predefined criteria such as content type, source, urgency, or other relevant attributes. This classification may leverage natural language processing, pattern recognition, or other data analysis techniques. The system may then consult the state-specific communication reference directory, which contains mappings between communication attributes (types, sources, urgencies) and the processing requirements or workflows predefined for them. This directory effectively guides the system in identifying the appropriate cloud computing component(s) for processing the communication and the expected processing routine. Based on the information from the reference directory, the system assigns the communication to a specific routine within the first cloud computing component. This routine is selected because it aligns with the communication's classification and processing requirements. The system determines the first workflow status of the communication within the assigned routine. This status could be as simple as "Received" or "In Queue," or something more specific that reflects the communication's processing context, such as "Awaiting Validation" or "PreProcessing." The first workflow status serves as a key indicator for mapping to the communication's processing state. This mapping is crucial because it reflects not just the position of the communication within a specific processing routine, but also its readiness, priority, and any immediate processing needs. The system determines the first state of the communication based on its initial workflow status. This state provides actionable insight into the communication's current processing phase and guides subsequent processing steps. For instance, a status of "Awaiting Validation" might map to a state that triggers a series of validation checks as the next processing step. As the communication progresses through the assigned routine within the cloud computing component, its workflow status is updated to reflect new stages of processing (e.g., "Validating," "Processing," "Completed"). Each update in workflow status prompts a reevaluation of the communication's state. The system dynamically updates the communication's state in response to changes in workflow status, ensuring that processing logic remains aligned with the communication's needs and the overall processing objectives. This dynamic state management allows for real-time monitoring and adjustments to the processing flow as needed. The system incorporates feedback from processing outcomes to refine the state-specific communication reference directory, optimizing workflow assignments and state mappings for future communications.

In some embodiments, the system determines an application dependency identifier of the first communication based on the state-specific communication reference directory corresponding to the first communication and determines the first state of the first communication being processed based on the application dependency identifier. Upon receiving a communication (or portion thereof), the system analyzes it to classify its type, source, content, urgency, and other relevant attributes. This classification may involve parsing the communication and applying algorithms or models designed to understand its context. The system then consults the state-specific communication reference directory, which contains detailed mappings that correlate types of communications with specific processing requirements, including any application dependencies that are necessary for processing. Based on the initial classification, the directory provides an application dependency identifier. This identifier points to a specific application or service that must be involved in processing the communication. For example, it could specify a particular database service, an authentication service, or a data analytics tool. The identifier not only specifies the application but also gives context about how it relates to the communication's processing needs. This context is crucial for understanding the role the application plays in the workflow and for determining the communication's initial processing state. The initial state of the communication is determined based on its application dependency identifier. For instance, if the dependency is on a data validation service, the initial state might be "Pending Validation." This state reflects both the current status of the communication and the immediate next steps in its processing journey. The application dependency identifier integrates the communication into a specific workflow or processing routine that involves the required application or service. This integration is guided by the system's understanding of the dependency's role and the overall processing objectives. The system dynamically manages the communication's state transitions in response to processing results, interactions with the dependent application, and other factors that influence the workflow. This approach ensures adaptive processing that can adjust to real-time conditions and processing outcomes. Information about processing outcomes, efficiency, and any challenges encountered is fed back into the system. This feedback can lead to updates in the state-specific communication reference directory, refining the mappings between communication types and application dependencies.

In some embodiments, the system determines a first performance metric of the first communication based on the state-specific communication reference directory corresponding to the first communication and determines the first state of the first communication being processed based on the first performance metric. For example, upon receiving the communication, the system performs an initial analysis to classify it according to type, urgency, content, and other relevant attributes. It consults the state-specific communication reference directory to identify processing guidelines, application dependencies, and expected performance metrics based on the communication's classification. This directory contains predefined benchmarks or thresholds for performance based on the communication type or processing requirements. Based on the guidelines obtained from the reference directory, the system identifies relevant performance metrics that are critical for assessing the processing quality or efficiency of the communication. These metrics could include processing time, throughput, error rates, latency, or resource utilization, among others. The system monitors the processing of the communication in real-time, collecting data to calculate the identified performance metric(s). This involves tracking the communication's interaction with cloud resources, applications, or services as specified by its processing pathway. The system evaluates the measured performance metric(s) against the benchmarks or thresholds specified in the reference directory. This evaluation determines whether the communication's processing is within expected performance parameters. The first state of the communication is determined based on the outcome of the performance evaluation. For instance, if the performance metric meets or exceeds expectations (e.g., processing time is below a certain threshold), the communication might be assigned a state indicating successful processing or readiness for the next processing stage. If the performance metric falls short of expectations (e.g., higher error rate than allowable), the communication might be assigned a state indicating a need for review, additional processing, or error handling. Depending on the initial state determined through performance evaluation, the system may trigger specific actions or state transitions. This could include routing the communication for additional processing, invoking error correction mechanisms, or escalating the issue for manual review. The system continues to monitor performance metrics throughout the communication's lifecycle, allowing for dynamic state adjustments in response to real-time performance data. This ensures that processing remains efficient and effective, with the ability to adapt to changing conditions or requirements. Insights gained from performance analysis can be used to update the state-specific communication reference directory, refining performance benchmarks and processing guidelines to better align with actual system capabilities and performance realities.

In some embodiments, the system may determine a location identifier of the first cloud computing component based on the state-specific communication reference directory corresponding to the first communication and determine the first state of the first communication being processed based on the location identifier. For example, upon receipt of a communication (or a portion thereof), the system performs an initial analysis to classify it according to various attributes, such as content type, urgency, source, and intended destination. It then consults the state-specific communication reference directory, which maps types of communications to specific processing requirements, including location-based processing preferences. This could involve rules for selection of specific components in the cloud network, data residency, latency optimization, and/or load distribution among different geographical zones. Based on the guidelines from the reference directory and the classification of the communication, the system determines the optimal location for processing the communication. This location identifies a specific cloud computing component or resource that is geographically or logically positioned to meet the communication's processing requirements. The system assigns a location identifier to the communication, which specifies the chosen cloud computing component. This identifier could represent a specific data center, cloud region, or availability zone that aligns with the communication's needs. With the location identifier determined, the system establishes the first state of the communication, reflecting its readiness for processing in the specified location. The state could indicate not just the physical or logical location of processing but also the communication's status in relation to location-specific processing steps (e.g., queued for processing in Region A, awaiting data residency validation). As the communication is processed by the specified cloud computing component, its state is updated to reflect progression through various location-specific stages. For example, after data residency checks are passed, the state might update to "In Processing-Region A". The system dynamically manages the communication's processing based on real-time conditions related to the specified location. This could involve rerouting the communication to another location if there are issues with availability, performance, or compliance in the initial location. The communication's state is continuously updated to reflect its current processing status, including any changes in location or processing conditions. This dynamic state management ensures that the system can respond to location-specific challenges and optimize processing efficiency and compliance. The system monitors location-specific processing performance, including latency, throughput, and compliance metrics. Insights gained from monitoring and performance analysis can inform updates to the state-specific communication reference directory, optimizing location-based processing guidelines and enhancing future decision-making for communication routing.

In some embodiments, the system may determine a security level identifier of the first cloud computing component based on the state-specific communication reference directory corresponding to the first communication and determine the first state of the first communication being processed based on the security level identifier. For example, upon receiving a communication (or portion thereof), the system analyzes its content, source, urgency, and especially any data sensitivity or security requirements. This classification is critical for understanding the security needs of the communication. Next, the system consults the state-specific communication reference directory. This directory maps types of communications to specific processing requirements, including security levels. The directory contains information on the security standards or certifications that various cloud computing components meet (e.g., ISO 27001, SOC 2, HIPAA compliance). Based on the communication's classification and the guidelines from the reference directory, the system determines the required security level for processing the communication. This involves matching the communication's security needs with the security capabilities and certifications of available cloud computing components. The system assigns a security level identifier to the communication, specifying the cloud computing component that meets the required security standards. This identifier effectively selects the component or service with the appropriate security posture for handling the communication. With the security level identifier determined, the system establishes the first state of the communication. This state reflects the communication's readiness for processing within the specified security context. For example, the state might indicate that the communication is "Pending Security Validation" or "In Secure Processing Queue". As the communication undergoes processing by the selected cloud computing component, its state is updated to reflect its progression through various security-centric stages. This could include encryption, access control validation, data masking, and other security measures. The system dynamically manages the communication's security posture, applying additional measures as needed based on real-time analysis and threat monitoring. This ensures that the communication remains protected throughout its processing lifecycle. The system also maintains detailed logs and reports related to security processing, ensuring compliance with relevant data protection regulations and standards. These logs can be crucial for audit trails, compliance verification, and incident investigation. The system monitors the effectiveness and efficiency of security measures applied during communication processing, gathering data on security incidents, response times, and compliance breaches, if any.

In some embodiments, the system determines a processing hierarchy characteristic of the first communication based on the state-specific communication reference directory corresponding to the first communication and determine the first state of the first communication being processed based on the processing hierarchy characteristic. For example, when a communication (or a portion thereof) is received, the system first classifies it based on available metadata or content analysis. This might involve identifying the communication type, source, urgency level, or other relevant attributes. The system consults the state-specific communication reference directory, which maps various communication characteristics to processing requirements and protocols. This directory is essentially a database or a set of rules that define how different types of communications should be handled. Based on the initial classification, the system matches the first communication with the appropriate processing hierarchy as specified in the reference directory. This hierarchy outlines the sequence of processing stages or layers that the communication must pass through. The processing hierarchy can be further customized or adjusted based on the state-specific attributes of the communication. This could involve dynamic adjustments to the processing stages, such as adding a decryption layer for secure communications or a data enrichment layer for communications requiring additional context. With the processing hierarchy established, the system determines the first state of the communication. This state is defined by its position or status within the assigned processing hierarchy at a given moment. Processing of the communication then proceeds according to the defined hierarchy, with each layer or stage in the hierarchy potentially altering the communication's state. The system monitors the processing progress and can dynamically adjust the processing hierarchy based on real-time feedback or changes in the communication's state. Once the communication has successfully passed through all the relevant stages of the processing hierarchy, it reaches a final state indicating that processing is complete. The system then takes any final actions required, such as delivering the communication to its intended recipient, triggering automated responses, archiving the communication for record-keeping, and/or updating the state of the communication.

In some embodiments, the system processes the first communication at the first cloud computing component using the first portion. The system may determine a second state of the first communication based on processing the first communication at the first cloud computing component using the first portion. The system may update the state-specific communication reference directory with the second state for the first communication. For example, the first cloud computing component receives the first portion of data and processes it according to its specific role or function. This could involve analytics, storage, transformation, or any other data processing operation. Information about the processing (such as completion status, resource utilization, or processing outcomes) can be fed back to the system to inform future data distribution decisions, helping to refine the splitter algorithm's performance over time. The system may continuously apply the splitter algorithm to incoming data streams, extracting portions and distributing them to appropriate cloud computing components for processing. This operation is dynamic and can adjust to changes in data volume, velocity, and variety, as well as fluctuations in resource availability.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for mitigating latency issues between cloud computing components using state-specific communication reference directories, the method comprising:

2. The method of any one of the preceding embodiments, further comprising: receiving a plurality of data streams; detecting a plurality of respective data stream identifiers in the plurality of data streams; extracting portions of the plurality of data streams based on the plurality of respective data stream identifiers; retrieving a state-specific communication reference directory; determining a first data stream identifier corresponding to a first portion of the portions of the plurality of data streams extracted based on the plurality of respective data stream identifiers; comparing the first data stream identifier to the state-specific communication reference directory to determine a first state of a first communication being processed; and in response to determining the first state of the first communication being processed, selecting a first cloud computing component of a plurality of cloud computing components to which to distribute the first portion.

3. The method of any one of the preceding embodiments, further comprising: extracting, using a splitter algorithm, the first portion from the plurality of data streams; and distributing, using the splitter algorithm, the first portion to the first cloud computing component.

4. The method of any one of the preceding embodiments, further comprising: processing the first communication at the first cloud computing component using the first portion; determining a second state of the first communication based on processing the first communication at the first cloud computing component using the first portion; and updating the state-specific communication reference directory with the second state for the first communication.

5. The method of any one of the preceding embodiments, further comprising: determining a cloud computing component identifier based on the state-specific communication reference directory corresponding to the first communication; and determining the first state of the first communication being processed based on the cloud computing component identifier.

6. The method of any one of the preceding embodiments, further comprising: determining a first workflow status of the first communication in a routine of the first cloud computing component based on the state-specific communication reference directory corresponding to the first communication; and determining the first state of the first communication being processed based on the first workflow status.

7. The method of any one of the preceding embodiments, further comprising: determining an application dependency identifier of the first communication based on the state-specific communication reference directory corresponding to the first communication; and determining the first state of the first communication being processed based on the application dependency identifier.

8. The method of any one of the preceding embodiments, further comprising: determining a first performance metric of the first communication based on the state-specific communication reference directory corresponding to the first communication; and determining the first state of the first communication being processed based on the first performance metric.

9. The method of any one of the preceding embodiments, further comprising: determining a location identifier of the first cloud computing component based on the state-specific communication reference directory corresponding to the first communication; and determining the first state of the first communication being processed based on the location identifier.

10. The method of any one of the preceding embodiments, further comprising: determining a security level identifier of the first cloud computing component based on the state-specific communication reference directory corresponding to the first communication; and determining the first state of the first communication being processed based on the security level identifier.

11. The method of any one of the preceding embodiments, further comprising: determining a processing hierarchy characteristic of the first communication based on the state-specific communication reference directory corresponding to the first communication; and determining the first state of the first communication being processed based on the processing hierarchy characteristic.

12. The method of any one of the preceding embodiments, further comprising: receiving a user input requesting the first communication; and in response to the user input, selecting the first data stream identifier from a plurality of data stream identifiers in the plurality of data streams.

13. The method of any one of the preceding embodiments, further comprising: receiving a user input; selecting a resource cluster characteristic based on the user input; and selecting, using an artificial intelligence model, the plurality of data streams for a resource cluster based on the resource cluster characteristic.

14. The method of any one of the preceding embodiments, further comprising: processing the first communication at the first cloud computing component using the first portion; and generating for display, on a user interface, a first output based on the processing the first communication.

15. A tangible, non-transitory, computer-readable medium storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. A system for mitigating latency issues between cloud computing components featuring relational databases without requiring session persistence using state-specific communication reference directories, the system comprising:
- one or more processors; and
- one or more non-transitory, computer-readable mediums, comprising instructions that, when executed by the one or more processors, cause operations comprising:
  - receiving a plurality of data streams;
  - determining a first data stream identifier corresponding to a first portion of portions of the plurality of data streams;
  - comparing the first data stream identifier to a state-specific communication reference directory to determine a first state of a first communication being processed;
  - in response to determining the first state:
    - selecting a plurality of cloud computing components to which to distribute the first portion;
    - splitting the first portion to generate split portions; and
    - distributing the split portions to the plurality of cloud computing components;
  - determining a second state of the first communication based on processing the first communication at a first cloud computing component of the plurality of cloud computing components using a first split portion of the split portions; and
  - updating the state-specific communication reference directory with the second state for the first communication.

2. A method for mitigating latency issues between cloud computing components using state-specific communication reference directories, the method comprising:
- receiving a plurality of data streams;
- determining a first data stream identifier corresponding to a first portion of portions of the plurality of data streams;
- comparing the first data stream identifier to a state-specific communication reference directory to determine a first state of a first communication being processed; and
- in response to determining the first state:
  - selecting a plurality of cloud computing components to which to distribute the first portion;
  - splitting the first portion to generate split portions; and
  - distributing the split portions to the plurality of cloud computing components.

3. The method of claim 2, wherein splitting the first portion to generate the split portions further comprises:
- retrieving a splitter algorithm; and
- extracting, using the splitter algorithm, the first portion from the plurality of data streams.

4. The method of claim 2, further comprising:
- detecting a plurality of respective data stream identifiers in the plurality of data streams; and
- extracting the portions of the plurality of data streams based on the plurality of respective data stream identifiers.

5. The method of claim 2, further comprising:
- determining a second state of the first communication based on processing the first communication at a first cloud computing component of the plurality of cloud computing components using a first split portion of the split portions; and
- updating the state-specific communication reference directory with the second state for the first communication.

6. The method of claim 2, wherein splitting the first portion to generate the split portions further comprises:
- receiving the first portion in series; and
- distributing the split portions in parallel.

7. The method of claim 2, further comprising:
- determining an application dependency identifier of the first communication based on the state-specific communication reference directory corresponding to the first communication; and
- determining the first state of the first communication being processed based on the application dependency identifier.

8. The method of claim 2, further comprising:

determining a first performance metric of the first communication based on the state-specific communication reference directory corresponding to the first communication; and determining the first state of the first communication being processed based on the first performance metric.

9. The method of claim 2, further comprising:

determining a location identifier of a first cloud computing component based on the state-specific communication reference directory corresponding to the first communication; and determining the first state of the first communication being processed based on the location identifier.

10. The method of claim 2, further comprising:

determining a security level identifier of a first cloud computing component based on the state-specific communication reference directory corresponding to the first communication; and determining the first state of the first communication being processed based on the security level identifier.

11. The method of claim 2, further comprising:

determining a processing hierarchy characteristic of the first communication based on the state-specific communication reference directory corresponding to the first communication; and determining the first state of the first communication being processed based on the processing hierarchy characteristic.

12. The method of claim 2, further comprising:

receiving a user input requesting the first communication; and in response to the user input, selecting the first data stream identifier from a plurality of data stream identifiers in the plurality of data streams.

13. The method of claim 2, further comprising:

receiving a user input;

selecting a resource cluster characteristic based on the user input; and selecting, using an artificial intelligence model, the plurality of data streams for a resource cluster based on the resource cluster characteristic.

14. The method of claim 2, further comprising:

processing the first communication at a first cloud computing component using the first portion; and generating for display, on a user interface, a first output based on processing the first communication.

15. One or more non-transitory, computer-readable mediums, comprising instructions that, when executed by one or more processors, cause operations comprising:

receiving a plurality of data streams;

determining a first portion of portions of the plurality of data streams;

comparing the first portion to a state-specific communication reference directory to determine a first state of a first communication being processed; and in response to determining the first state:

selecting a plurality of cloud computing components to which to distribute the first portion;

splitting the first portion to generate split portions; and distributing the split portions to the plurality of cloud computing components.

16. The one or more non-transitory, computer-readable mediums of claim 15, wherein splitting the first portion to generate the split portions further comprises:

retrieving a splitter algorithm; and extracting, using the splitter algorithm, the first portion from the plurality of data streams.

17. The one or more non-transitory, computer-readable mediums of claim 15, further comprising:

detecting a plurality of respective data stream identifiers in the plurality of data streams; and extracting the portions of the plurality of data streams based on the plurality of respective data stream identifiers.

18. The one or more non-transitory, computer-readable mediums of claim 15, further comprising:

determining a second state of the first communication based on processing the first communication at a first cloud computing component of the plurality of cloud computing components using a first split portion of the split portions; and updating the state-specific communication reference directory with the second state for the first communication.

19. The one or more non-transitory, computer-readable mediums of claim 15, wherein splitting the first portion to generate the split portions further comprises:

receiving the first portion in series; and distributing the split portions in parallel.

20. The one or more non-transitory, computer-readable mediums of claim 15, wherein splitting the first portion to generate the split portions further comprises:

distributing the split portions in parallel; and maintaining a required communication sequence while distributing the split portions.

* * * * *